US008976968B2

(12) United States Patent
Bell et al.

(10) Patent No.: US 8,976,968 B2
(45) Date of Patent: *Mar. 10, 2015

(54) INTERCEPTING A COMMUNICATION SESSION IN A TELECOMMUNICATION NETWORK

(75) Inventors: Robert T. Bell, Bountiful, UT (US); Subbiah Kandasamy, Fremont, CA (US); Daniel G. Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/466,598

(22) Filed: May 8, 2012

(65) Prior Publication Data

US 2012/0219153 A1    Aug. 30, 2012

Related U.S. Application Data

(63) Continuation of application No. 11/116,644, filed on Apr. 28, 2005, now Pat. No. 8,175,277.

(51) Int. Cl.
*H04L 9/08* (2006.01)
*H04L 29/06* (2006.01)

(52) U.S. Cl.
CPC ............ *H04L 9/0827* (2013.01); *H04L 63/061* (2013.01); *H04L 63/102* (2013.01); *H04L 63/30* (2013.01); *H04L 9/083* (2013.01); *H04L 63/0442* (2013.01); *H04L 2209/60* (2013.01)
USPC ........................................................ 380/278

(58) Field of Classification Search
USPC .......................................................... 380/278
See application file for complete search history.

(56) References Cited

U.S. PATENT DOCUMENTS

| | | | |
|---|---|---|---|
| 5,367,667 A | 11/1994 | Wahlquist et al. | |
| 5,502,766 A * | 3/1996 | Boebert et al. | 713/193 |
| 5,850,451 A | 12/1998 | Sudia | |
| 6,026,500 A | 2/2000 | Topff et al. | |
| 6,178,506 B1 | 1/2001 | Quick, Jr. | |
| 6,212,636 B1 | 4/2001 | Boyle et al. | |
| 6,230,287 B1 | 5/2001 | Pinard et al. | |
| 6,353,446 B1 | 3/2002 | Vaughn et al. | |
| 6,898,288 B2 | 5/2005 | Chui | |
| 6,993,137 B2 * | 1/2006 | Fransdonk | 380/279 |
| 7,275,156 B2 * | 9/2007 | Balfanz et al. | 713/168 |
| 2001/0050990 A1 | 12/2001 | Sudia | |
| 2004/0230840 A1 | 11/2004 | Radatti | |
| 2005/0086255 A1 | 4/2005 | Schran et al. | |
| 2005/0174937 A1 | 8/2005 | Scoggins et al. | |

* cited by examiner

*Primary Examiner* — Tu Nguyen
(74) *Attorney, Agent, or Firm* — Baker Botts L.L.P.

(57) ABSTRACT

Intercepting a secure communication session includes distributing a key from a key distribution point to establish a secure communication session between a first endpoint and a second endpoint. A secure channel is established between the key distribution point and an intercepting point. The intercepting endpoint may be determined to be authorized to intercept the secure communication session. The key is provided to the intercepting endpoint only if the intercepting endpoint is authorized to intercept the secure communication session, where the key provides the intercepting endpoint with access to intercept the secure communication session.

21 Claims, 1 Drawing Sheet

INTERCEPTING A COMMUNICATION SESSION IN A TELECOMMUNICATION NETWORK

RELATED APPLICATION

This application is a continuation of U.S. application Ser. No. 11/116,644, filed Apr. 28, 2005, and entitled "Intercepting a Communication Session in a Telecommunication Network", now U.S. Pat. No. 8,175,277.

TECHNICAL FIELD

This invention relates generally to the field of telecommunications and more specifically to intercepting a communication session in a telecommunication network.

BACKGROUND

A call between endpoints may be intercepted in order to provide information about the call to an intercepting point. For example, if an endpoint is experiencing difficulty with a call, a help desk may access the call in order to gather information about the call. Known techniques for intercepting a call, however, may have difficulty providing an intercept for a secure call. Consequently, known techniques for providing an intercept in a telecommunications network may be unsatisfactory in certain situations.

SUMMARY OF THE DISCLOSURE

In accordance with the present invention, disadvantages and problems associated with previous techniques for intercepting a communication session in a telecommunication network may be reduced or eliminated.

According to one embodiment of the present invention,

Certain embodiments of the invention may provide one or more technical advantages. A technical advantage of one embodiment may be that a key distribution point determines whether an intercepting point is authorized to intercept a call, and provides a key to the point if the point is authorized. Determining whether an intercepting point is authorized may reduce unauthorized interception. Another technical advantage of one embodiment may be that the key may provide for a specific type of interception. For example, the key may allow for intercept of a media stream.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
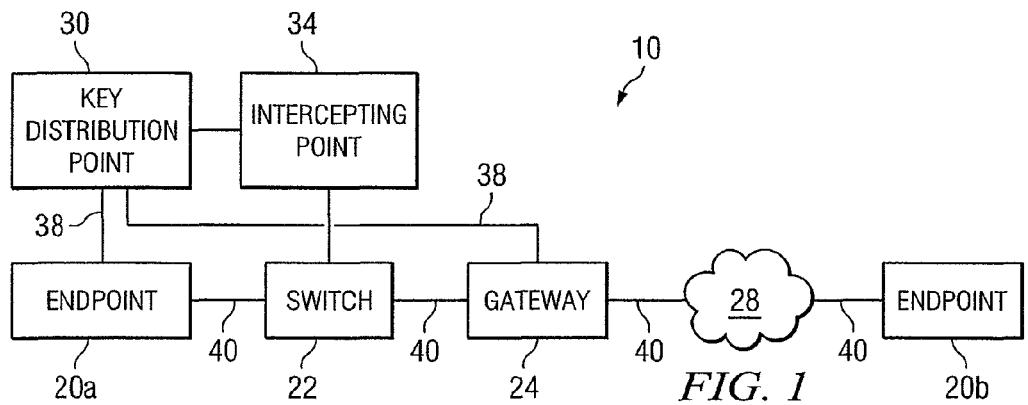
FIG. 1 is a block diagram of one embodiment of a system for intercepting a communication session in a telecommunication network.
Figure 2:
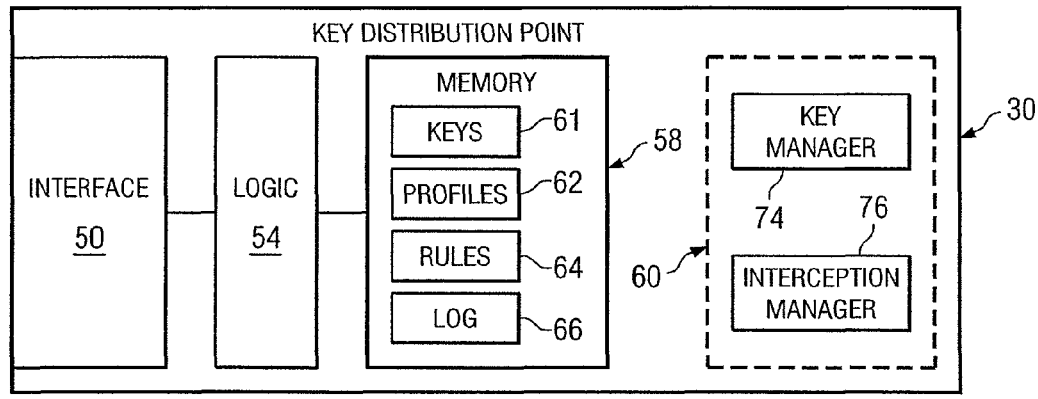
FIG. 2 is a block diagram illustrating one embodiment of key distribution point of the system of FIG. 1.
Figure 3:
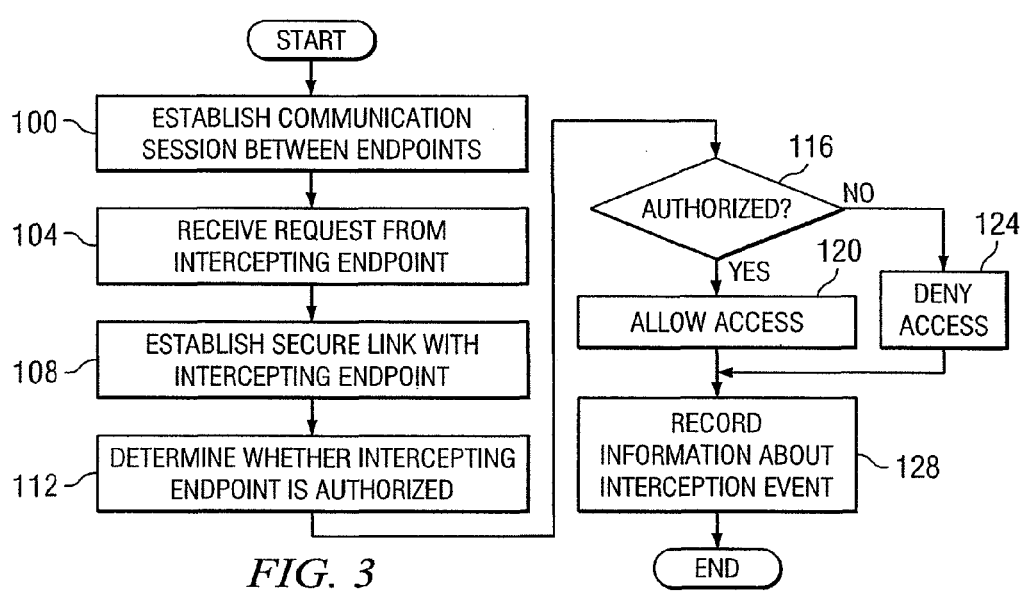
FIG. 3 is a flowchart illustrating one embodiment of a method for intercepting a communication session in a telecommunication network that may be used with the system of FIG. 1.

Embodiments of the present invention and its advantages are best understood by referring to FIGS. 1 through 3 of the drawings, like numerals being used for like and corresponding parts of the various drawings.

FIG. 1 is a block diagram of one embodiment of a system 10 for intercepting a communication session in a telecommunication network. In general, system 10 includes a key distribution point that allows an intercepting point to intercept a stream of a call session between endpoints. The key distribution point may allow for interception in accordance with interception rules.

According to the illustrated embodiment, system 10 includes endpoints 20, a switch 22, a gateway 24, a communication network 28, a key distribution point 30, and an intercepting point 34 coupled as shown.

Endpoints 20*a-b* may be engaged in a communication session. An endpoint represents any suitable combination or arrangement of logic for providing communication services such as telephony services. Logic may refer to hardware, software, or any suitable combination of hardware and software. Examples of an endpoint 20 may include a telephone such as a cellular telephone, a personal digital assistant, a voice appliance, an answering machine, a facsimile machine, a computer, a server, or other device operable to provide communication services. Endpoint 20 may support, for example, Session Initiation Protocol (SIP), Internet Protocol (IP), or any other suitable communication protocol.

A communication session, such as a call session, allows for the transfer of packets between endpoints 20. A packet may comprise a bundle of data organized in a specific way for transmission, and a frame may comprise the payload of one or more packets organized in a specific way for transmission. Packets may include traffic control packets and media packets. A control packet typically includes a traffic control message such as a signaling message. A media packet typically includes media content such as data, voice, audio, video, multimedia, any other suitable type of information, or any combination of the preceding.

A control channel may refer to a logic channel that carries a control stream comprising control packets. According to the illustrated embodiment, control channel carries control traffic between endpoint 20*a* and gateway 24 through key distribution point 30. A media channel may refer to a logic channel that carries a media stream comprising media packets. According to the illustrated embodiment, media channel 40 carries a media stream between endpoints 20*a-b* through switch 40 and gateway 24.

Switch 24 represents any suitable combination or arrangement of logic operable to duplicate the media stream carried by media channel 40 and send the duplicated stream to intercepting point 34. Gateway 24 represents any suitable combination or arrangement of logic operating as an interface to communication network 28. Gateway 24 may create a context such as a Packet Data Protocol (PDP) context that allows endpoint 20*a* to access communication network 28.

Gateway 24 may support features such as packet routing and transfer, mobility management, quality-of-service negotiation and handling, mobile authentication through a remote authentication dial-in user service (RADIUS), dynamic IP addressing through a dynamic host configuration protocol (DHCP), network management, and charging data collection. Other features that may be supported include IP routing, IP tunneling, domain name system (DNS) support, DHCP support, and RADIUS support. Gateway 24 may perform its functions according to any suitable standard.

Communication network 28 allows endpoints 20 to communicate with other networks or devices. Communication network 28 may comprise all or a portion of public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

Key distribution point 30 represents any suitable combination or arrangement of logic operable to provide access to a communication session between endpoints 20. Key distribution point 30 may provide access by determining whether intercepting point 34 is authorized to intercept a communication session. If intercepting point 34 is authorized, then key distribution point 30 sends session keying material, such as an authorization key or a public key, to intercepting point 34. Key distribution point 30 may also direct switch 22 to forward the media stream to intercepting point 34. According to one embodiment, key distribution point 30 may be located at a call manager. Key distribution point 30 is described in more detail with reference to FIG. 2.

Intercepting point 34 represents any suitable combination or arrangement of logic operable to intercept one or more streams between endpoints 20. A first example intercepting point 34 may comprise a help desk. The help desk may intercept a media stream in order to determine any problems with the media stream. The media stream may comprise raw material that may be used to detect problems. A second example intercepting point 34 may comprise a legal enforcement agency. The legal enforcement agency may be legally authorized by a wire tap order to monitor a media stream. A third intercepting point 34 may include a call center manager. The call center manager may monitor a media stream of a customer calling the call center.

Intercepting point 34 may have a corresponding point profile that may be used to identify and verify intercepting point 34. A point profile of a point may comprise a point identifier, address, name, passcode, or any combination of the preceding. A point identifier may comprise, for example, a user identifier or a device identifier.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of switch 22 and gateway 24 may be performed by one module, or the operations of key distribution point 30 may be performed by more than one module. Additionally, operations of system 10 may be performed using any suitable logic comprising software, hardware, other logic, or any suitable combination of the preceding. As used in this document, "each" refers to each member of a set or each member of a subset of a set.

FIG. 2 is a block diagram illustrating one embodiment of key distribution point 30 of system 10 of FIG. 1. Key distribution point 30 determines whether intercepting point 34 is authorized to intercept a communication session. If intercepting point 34 is authorized, then key distribution point 30 sends session keying material, such as an authorization key or a public key, to intercepting point 34. Key distribution point 30 may also direct switch 22 to forward the media stream to intercepting point 34.

According to the illustrated embodiment, key distribution point 30 includes an interface (I/F) 50, logic 54, a memory 58, and one or more applications 60 coupled as shown. Interface 50 sends and receives packets. As used in this document, the term "interface" refers to any suitable structure, logic, or both structure and logic operable to receive input for the device, send output from the device, or both, and may comprise one or more ports and one or more protocol converters.

Interface 50 may include procedures for providing a secure channel between key distribution point 30 and intercepting point 34. A secure channel may refer to a channel that protects information transmitted through the channel. The secure channel may be used while setting up the intercept and delivering the intercept information. According to one embodiment, the secure channel may comprise, for example, a secure socket layer (SSL) link, a transport layer security (TLS) link, or a combination SSL/TLS link.

Logic 54 manages the operation of key distribution point 30, and may comprise any suitable hardware, software, or combination of hardware and software. For example, logic 54 may include a processor. "Processor" refers to any suitable device operable to execute instructions and manipulate data to perform operations.

Memory 58 stores and facilitate retrieval of information used by logic 54. "Memory" refers to any structure operable to store and facilitate retrieval of information, and may comprise Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

According to one embodiment, memory 58 may store session keys 61, point profiles 62, interception rules 64, and a log 66. Session keys 61 refer to keys that provide access to a session. The key may comprise a public key of a public/private key pair. Point profiles includes point profiles of endpoints 20 and intercepting points 34. The profiles may be stored in a CISCO Intelligent Recorder (iREC) database.

Interception rules 64 specify whether intercepting points 34 has authorization to access a session. For example, rules 64 may specify that intercepting points 34 with profiles in point profiles 62 are authorized. Interception rules 64 may also specify the type of access that an intercepting point 34 may have. The type of access may describe the conditions under which access is authorized. As a first example, intercepting point 34 may have authorization to obtain only a specific type of session key. For example, intercepting point 34 may only be able to have only one of a media session key for accessing a media stream or of a control session key for accessing a control stream. As a second example, intercepting point 34 may only be able to access sessions between particular endpoints 20.

As a third example, intercepting point 34 may be authorized to obtain access at certain time periods, for example, between specified times on specified dates. As a fourth example, access may be provided for a certain amount of time, such as a certain number of minutes. As a fifth example, once access has been authorized, access may be provided for one or more streams of the call.

Log 66 records information about the interception events. According to one embodiment, log 66 may record an interception record for each media stream. The interception record may include a record identifier, the date of the interception, the time of the interception, endpoints 20 involved in the call, encryption material communicated during the interception, other suitable information about the interception, or any combination of the preceding.

Applications 60 include key manager 74 and interception manager 76. Key manager 74 may provide authorized points access to a communication session by, for example, sending key material to an authorized point. According to one embodiment, key manager 74 may send a key to endpoints 20 to allow for a secure communication session between endpoints 20. Key manager 74 may then send the key to intercepting point 34 to allow intercepting point 34 access to the secure communication session.

According to one embodiment, key manager 74 may use public key-private key encryption to provide for secure communications between two points. Information encrypted with a public key can be unencrypted with a private key, and information encrypted with a private key can be unencrypted with a public key. A first point may keep a private key and supply a complementary public key to a second point. The first point may encrypt information with the private key and transmit the information to the second endpoint. The second endpoint may use the public key to decrypt the encrypted information, thereby authenticating the first endpoint.

Interception manager 76 determines whether intercepting point 34 is authorized to intercept a communication session. If intercepting point 34 is authorized, then interception manager 76 allows intercepting point 34 to intercept the communication session. According to one embodiment, interception manager 76 receives a request for an interception. The request may be received from intercepting endpoint 34. The request may include point profile information and session identifier information. Interception manager 76 may use point profile information to verify intercepting endpoint 34.

Interception manager 76 determines whether intercepting point 34 is authorized to intercept a call. Authorization may be determined in accordance with interception rules 64. If intercepting point 34 is authorized, then interception manager 76 instructs key manager 74 to provide a key to intercepting point 34. Interception manager 76 may use the session identifier information to identify the session or streams requested for interception. Interception manager 76 also sets up communication links to allow intercepting point 34 to intercept the session. For example, interception manager may also instruct switch 22 to duplicate the media stream to send to intercepting point 34.

Any suitable intercept information may be sent to intercepting point 34. Intercept information may include, for example, key material, stream information, call session information, encryption material, other information, or any combination of the preceding. Key material, such as an authorization key or a public key, may provide intercepting point 34 with access. Stream information may include media packets, control packets, or both media and control packets. Call session information may comprise, for example, the time of the call. The encryption material may allow intercepting point 34 to encrypt and decrypt packets.

Interception manager 76 may be restricted by interception rules 66 from sending certain types of information, such as the identity of the caller or the phone number of the caller. Intercepting endpoint 34 may be restricted to receive only needed information.

Interface 50, processor 54, memory 58, and applications 60 may be integrated or separated according to particular needs. For example, the present invention contemplates the functions of both processor 54 and memory 58 being provided using a single device. If processor 54 and memory 58 are separated, interface 20 may be coupled to processor 54 using a bus or other suitable link.

Modifications, additions, or omissions may be made to key distribution point 30 without departing from the scope of the invention. The components of key distribution point 30 may be integrated or separated according to particular needs. Moreover, the operations of key distribution point 30 may be performed by more, fewer, or other modules. For example, the operations of key manager 74 and interception manager 76 may be performed by one module, or the operations of interception manager 76 may be performed by more than one module. Additionally, operations of key distribution point 30 may be performed using any suitable logic comprising software, hardware, other logic, or any suitable combination of the preceding.

FIG. 3 is a flowchart illustrating one embodiment of a method for intercepting a communication session in a telecommunication network that may be used with system 10 of FIG. 1. The method begins at step 100, where a communication session between endpoints 20 is established. A call manager that includes key distribution point 30 may establish the communication session.

Key distribution point 30 receives an intercept request at step 104. The intercept request identifies the requesting intercepting endpoint 34 and the requested session. A secure link is established between key distribution point 30 and intercepting endpoint 34 at step 108. Key distribution point 30 determines whether intercepting point 34 is authorized to intercept the session at step 112. Authorization may be determined in accordance with interception rules 64 that define whether intercepting point 34 is authorized. Intercepting points that are not verified or not recognizable may be deemed unauthorized.

If intercepting point 34 is authorized at step 116, key distribution point 30 provides intercepting endpoint 34 with access to the session at step 120. Key distribution point 30 may send key material to intercepting endpoint 34 to allow intercepting endpoint 34 to access the session. Key distribution point 30 may also instruct the switch to duplicate the media stream to send to intercepting point 34. The method then proceeds to step 128.

If intercepting point 34 is not authorized at step 116, key distribution point 30 denies intercepting endpoint 34 access to the session at step 124. Key distribution point 30 may send a notification that access is denied. The method then proceeds to step 128. Key distribution point 30 records information about the interception event in log 66 at step 128. For example, key distribution point 30 may record whether access was provided or denied. After recording information about the interception event, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a key distribution point determines whether an intercepting point is authorized to intercept a call, and provides a key to the point if the point is authorized. Determining whether an intercepting point is authorized may reduce unauthorized interception. Another technical advantage of one embodiment may be that the key may provide for a specific type of interception. For example, the key may allow for intercept of a media stream.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method, comprising:

distributing one or more session keys from a key distribution point to establish a secure communication session between a first endpoint and a second endpoint;

establishing a secure channel between the key distribution point and a first intercepting endpoint using an authentication protocol;

determining, by one or more hardware processors of the key distribution point, that the first intercepting endpoint is authorized to intercept the secure communication session by determining that an interception rule stored in memory authorizes the first intercepting endpoint to receive at least one of the session keys; and in response to determining that a request to intercept the secure communication session by the first intercepting endpoint is authorized, transmitting, from the key distribution point to the first intercepting endpoint, the session key, the session key providing the first intercepting endpoint with access to intercept the secure communication session.

2. The method of claim 1, wherein the session key transmitted from the key distribution point to the first intercepting point comprises a control session key for accessing a control stream.

3. The method of claim 1, wherein the one or more session keys comprise a media session key and a control session key for accessing a control stream.

4. The method of claim 3, further comprising transmitting, from the key distribution point to the first intercepting endpoint, the control session key but not the media session key.

5. The method of claim 3, further comprising:

determining whether a second interception rule authorizes a second intercepting endpoint for the media session key but not the control session key;

transmitting the media session key but not the control session key to the second intercepting endpoint.

6. The method of claim 1, further comprising:

determining whether the interception rule authorizes interception by the first intercepting endpoint based on a caller identity corresponding to the first endpoint.

7. The method of claim 1, wherein:

determining whether the interception rule authorizes interception by the first intercepting endpoint on specified dates; and transmitting the session key to the first intercepting endpoint if the first intercepting endpoint is requesting access on the specified dates.

8. A system, comprising:

one or more hardware processors executing a key manager operable to distribute one or more session keys in order to establish a secure communication session between a first endpoint and a second endpoint; and the one or more hardware processors executing an interception manager coupled to the key manager and operable to:

establish a secure channel between the key manager and a first intercepting endpoint using an authentication protocol;

determine that the first intercepting endpoint is authorized to intercept the secure communication session by determining that an interception rule stored in memory authorizes the first intercepting endpoint to receive at least one of the session keys; and in response to determining that a request to intercept the secure communication session by the first intercepting endpoint is authorized, transmit, from the key manager to the first intercepting endpoint, the session key, the session key providing the first intercepting endpoint with access to intercept the secure communication session.

9. The system of claim 8, wherein the session key transmitted from the key manager to the first intercepting point comprises a control session key for accessing a control stream.

10. The system of claim 8, wherein the one or more session keys comprise a media session key and a control session key for accessing a control stream.

11. The system of claim 10, the one or more hardware processors executing the interception manager further operable to transmit, from the key distribution point to the first intercepting point, the control session key but not the media session key.

12. The system of claim 10, the one or more hardware processors executing the interception manager further operable to:

determine that a second interception rule authorizes a second intercepting endpoint for the media session key but not the control session key;

transmit the media session key but not the control session key to the second intercepting endpoint.

13. The system of claim 8, the one or more hardware processors executing the interception manager further operable to:

determine whether the interception rule authorizes interception by the first intercepting endpoint based on a caller identity corresponding to the first endpoint.

14. The system of claim 8, the one or more hardware processors executing the interception manager further operable to:

determine whether the interception rule authorizes interception by the first intercepting endpoint on specified dates; and transmit the session key to the first intercepting endpoint if the first intercepting endpoint is requesting access on the specified dates.

15. Software logic encoded in one or more non-transitory media for execution and when executed by one or more processors operable to:

distribute one or more session keys from a key distribution point to establish a secure communication session between a first endpoint and a second endpoint;

establish a secure channel between the key distribution point and a first intercepting endpoint using an authentication protocol;

determine, by one or more processors of the key distribution point, that the first intercepting endpoint is authorized to intercept the secure communication session by determining that an interception rule stored in memory authorizes the first intercepting endpoint to receive at least one of the session keys; and in response to determining that a request to intercept the secure communication session by the first intercepting endpoint is authorized, transmit, from the key distribution point to the first intercepting endpoint, the session key, the session key providing the first intercepting endpoint with access to intercept the secure communication session.

16. The logic of claim 15, wherein the session key transmitted from the key manager to the first intercepting endpoint comprises a control session key for accessing a control stream.

17. The logic of claim 15, wherein the one or more session keys comprise a media session key and a control session key for accessing a control stream.

18. The logic of claim 17, further operable to transmit, from the key distribution point to the first intercepting endpoint, the control session key but not the media session key.

19. The logic of claim 17, further operable to:
determine that a second interception rule authorizes a second intercepting endpoint for the media session key but not the control session key;
transmit the media session key but not the control session key to the second intercepting endpoint.

20. The logic of claim 17, further operable to:
determine whether the interception rule authorizes interception by the first intercepting endpoint based on a caller identity corresponding to the first endpoint.

21. The logic of claim 17, further operable to:
determine whether the interception rule authorizes interception by the first intercepting endpoint on specified dates; and
transmit the session key to the first intercepting endpoint if the first intercepting endpoint is requesting access on the specified dates.

\* \* \* \* \*